Aug. 23, 1966   J. C. MORRISS, JR   3,267,547
PIPE CLAMP
Filed Feb. 10, 1964
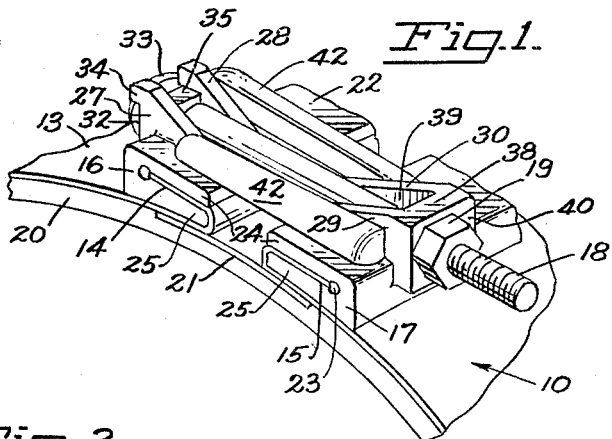
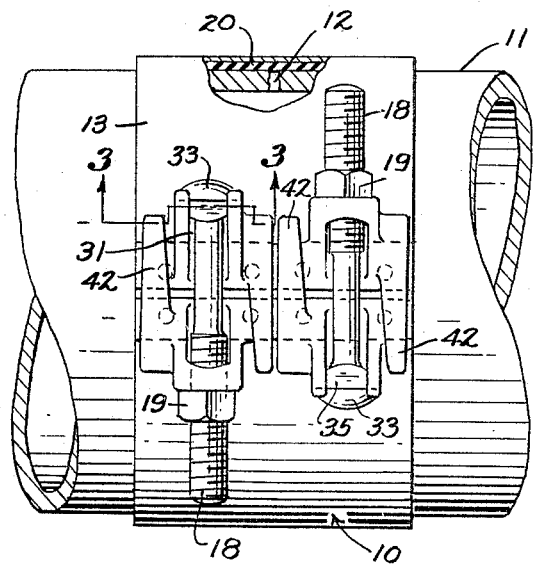
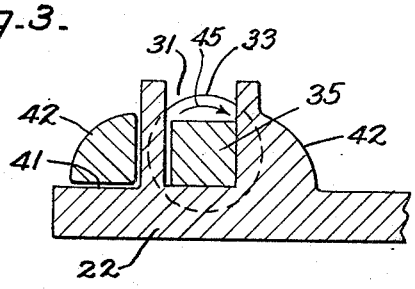
INVENTOR.
JAMES C. MORRISS, JR.
BY
ATTORNEY

3,267,547
PIPE CLAMP
James C. Morriss, Jr., Nash, Tex., assignor to Smith-Blair, Inc., San Francisco, Calif., a corporation of California
Filed Feb. 10, 1964, Ser. No. 343,673
2 Claims. (Cl. 24—279)

This invention relates to pipe clamps and pipe couplings of the type in which rigid lugs are used to secure together the ends of a flexible band that goes around the pipe. More particularly, it relates to an improved structure of mating lugs for such pipe clamps.

Pipe clamps of the malleable band type are well known in the art and generally comprise a pair of rigid clamp lugs attached to the ends of the flexible band. The band is then tightened around the pipe by bolts retained on the lugs. A particularly successful form of pipe clamp described in U.S. Patent No. 3,089,212 utilizes tangentially projecting fingers on each lug which extend to and bear downwardly on the opposite lug and thereby prevent the bending of the bolts when they are tightened. On this, as well as on other earlier forms of clamps, the bolts are retained by upright projections that are spaced apart on the lug base portions which extend parallel to the pipe being repaired.

In clamps having the aforesaid bolt retaining projections and particularly the finger type pipe clamps, a problem arose where unusually large torsional forces were applied in tightening the nuts on the bolts. What happened was that as each nut was tightened it eventually ceased to turn freely on the bolt shank, and instead transmitted the torque applied it through the bolt to the head end of the bolt. This twisting force thus exerted by the bolt head was sufficient in some instances to cause either a complete failure or a bending of one of the upright projections on the clamp lug adjacent to the bolt head. It is therefore a principal object of the present invention to overcome the aforesaid problem and provide a stronger, more reliable and endurable pipe clamp of the type having upwardly extending bolt retaining projections.

Another object of the invention is to provide an improved pipe clamp of the type having upright bolt retaining projections and stabilizing torque arms or fingers on its lugs, and moreover a clamp of this type which is capable of withstanding unusually high torsional loads on the bolts without failure to the bolt retaining projection.

A significant feature of the present invention is that the aforesaid objectives of increased strength and durability are accomplished by virtue of a unique arrangement of the clamp lug elements wherein the stabilizing fingers are located on the lugs so that they structurally reinforce the bolt retaining projections which are subjected to a torsional force exerted by the bolt head. Therefore, the fingers provide a new function of strengthening these projections to resist any force exerted by the bolt as the clamp lugs are drawn together, and a stronger lug is made possible with no net increase in the amount of metal used in the lugs and thus in their weight.

Other objects, advantages and features of the invention will become apparent from the following description thereof presented with the accompanying drawings and in accordance with 35 USC 112.

In the drawings:

FIG. 1 is a fragmentary view in perspective showing a portion of a pipe clamp embodying the principles of the invention;

FIG. 2 is a plan view of the clamp shown in FIG. 1;

FIG. 3 is a view in section taken along the line 3—3 of FIG. 2.

Referring to the drawings, FIGS. 1 and 2 show a pipe clamp 10 embodying the principles of the present invention as it appears when tightened around a section of pipe 11 having a crack or hole indicated by numeral 12. Generally, the clamp comprises a malleable band 13 whose ends 14 and 15 are preferably bent over for installation in two lugs 16 and 17. The lugs are tightened together by bolts 18 and nuts 19 which serve to pull the band 13 around a gasket 20 or directly around the pipe 11, if desired. A gasket 20 is most generally used and preferably it is provided with an armoring strip 21 adjacent the bite of the lugs 16 and 17, thus providing a rigid surface on which the lugs can bear to maintain adequate sealing pressure on the gasket 20 between the lugs.

As with the previous finger type clamps, the lugs 16 and 17 are preferably cast from some ductile material such as bronze or malleable iron. As shown in FIG. 1, each of the lugs has a somewhat wedge-shaped base portion 22 which when attached to the band 13 extends generally axially along the pipe 11. The base 22 of each mating lug 16 and 17 is provided with a slot 23 forming a pair of jaws 24 and 25 into which the ends 14 and 15 of the malleable clamping band 13 are secured. The jaws 24 and 25 are preferably cast in the open position and are then coined together to grip the ends of the band and hold them in place when the lugs are forced together. However, other means may be used to attach the ends of the bands 13 to the lugs.

Extending upward from the upper surface of the lug base portions are a series of integral projections for retaining the bolts 18. These projections not only function to align the mating clamp lugs by confining the interconnecting bolts, but they also serve as a means to restrain each bolt from twisting as the nut is tightened thereon. As shown, they are arranged in pairs and are designated by the numerals 27, 28 and 29, 30. On both of the lugs 16 and 17 the projections 27, 28 define between them a bolt receiving channel or slot 31. The faces 32 of the channel defining members 27 and 28 on which the head 33 of a bolt bears have outwardly extending ears 34 to hold the bolt head in place. The bolt fits with its head 33 bearing against the faces 32 and with its square shank portion 35 fitting fairly snugly in the slot 31.

The projections 29 and 30 adapted to retain the nut end of the bolt are also spaced apart on both of the lugs 16 and 17, and they are connected together along their upper edges by a bridged over portion 38. Thus, at their outer end, the bridged projections 29 and 30 provide an opening 39 in which the bolt 18 is secured prior to assembly of the clamp 10 on a pipe. The end of this slotted opening 39 has a flat face 40 against which the nut 19 or a washer will bear when the nut is screwed down to tighten the clamp. Along each of the lugs 16 and 17 separate pairs of projections 27, 28 and 29, 30 are spaced apart, preferably alternately, along the base portions 22 of each of the lugs 16 and 17. Thus, as seen in FIG. 2, in each pair of mating lugs all of the bridged over projections 29 and 30 on one lug are aligned with the slotted projections 27 and 28 on the opposite mating lug and adjacent bolts will be arranged with their head ends on opposite lugs.

In the drawings, the clamp 10 is shown having the lugs 16 and 17 each with only two pairs of projections 27, 28 and 29, 30. However, it is obvious that clamps of greater axial length having any desired number of pairs of projections may be constructed within the scope of the invention. The pairs of projections 27, 28 and 29, 30 are spaced apart at intervals along the lugs 16 and 17 and from the end of the lugs so that adjacent each pair of projections the upper side 41 of the wedge-shaped lug body portion 22 forms a bearing surface.

Secured to each of the lugs 16 and 17 are a plurality of stabilizing arms or fingers 42 which project in the same general plane as the bolts 18. Each finger 42 has a lower surface 43 which is substantially coplanar with and thereby adapted to slidably engage the smooth planar bearing surfaces formed by the upper surface of the opposite lug base portion adjacent a pair of projections. Each of the fingers 42 is not only secured to a lug base portion 22 but it is also secured to the outer side of one of the upright projections for retaining a bolt. In accordance with the invention, each finger 42 for the unbridged projections 27 and 28 which retain the head ends 33 of the bolts is attached to the upright projection 28 which is on the right hand side of the bolt 18 when viewed from its threaded end toward its head end. The unusual results produced by this arrangement are best described by reference to FIG. 3. As seen in this cross sectional view, the large torque applied to the nut on the bolt 18 causes the flat sided portion 35 of the bolt 18 to apply a large bending moment or lateral force indicated by the arrow 45 on the projection 28. Projections of the form heretofore used, such as in clamps where a finger was attached to the opposite projection 27, were subject to failure due to this force or bending moment. However, in the present invention, the finger 42 disposed between the projection 28 and the lug base 22 prevents any such failure. In effect, this particular finger, so located, provides a re-enforcement to the adjoining projection 28 and thereby completely eliminates the effects of any bolt force exerted laterally against it.

It is important to note with my invention that no additional fingers are required over the number used by prior art clamps, since in addition to its new function, the finger 42 also carries out its original purpose of preventing bolt bending by extending across and bearing downward on the upper surface 41 of the opposite lug. Therefore, in the present invention a problem of structural weakness has been overcome by a unique arrangement of elements without the need for a complicated change in the lug configuration or the addition of any weight to the lug.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. In a pipe clamp of the type having a malleable band with end portions secured in lugs, with the lugs in pairs and tightened together by bolts of the type having a flat-sided portion near its head end and a series of threads at its opposite end, said bolts being alternately disposed between the pair of lugs with the head ends and threaded ends of adjacent bolts opposite each other, the combination wherein each said lug comprises an elongated base member, at least one pair of generally parallel upright and connected projections for receiving a threaded end of a bolt and spaced therefrom at least one pair of generally parallel upright and unconnected projections on said base member, said unconnected projections on both said lugs define between them an open slot for receiving the flat-sided portion of a bolt, said open slots being aligned with openings for receiving the threaded ends of the bolts which are formed by said pairs of upright and connected projections on the base member of the opposite lug, said connected projections on both said lugs having a bearing face for a nut on the bolt extending through an aligned slot and an opening, a strengthening means extending between the base member of each said lug and the outside surface of one of each pair of unconnected upright projections, said strengthening means being adjacent the right-hand side of the bolt when viewed from its threaded end toward the opposite head end and operable to prevent any substantial deflection in the adjacent projection due to the force exerted on it when a nut is tightened on the threaded end of the bolt.

2. The pipe clamp as defined in claim 1 wherein said strengthening means comprises a lug stabilizing finger having a root portion integral with the lug base and also the adjacent upright projection, said finger extending tangentially from said first lug across to said second lug to bear upon the latter's base member.

References Cited by the Examiner

UNITED STATES PATENTS

| | | | |
|---|---|---|---|
| 2,897,568 | 8/1959 | Hoke | 24—279 |
| 2,980,143 | 4/1961 | Harris. | |
| 3,088,185 | 5/1963 | Smith | 24—279 |
| 3,089,212 | 4/1963 | Graham et al. | 24—279 |

WILLIAM FELDMAN, *Primary Examiner.*

DONLEY J. STOCKING, *Examiner.*

D. GRIFFIN, *Assistant Examiner.*